United States Patent
Wu et al.

(10) Patent No.: US 8,749,645 B2
(45) Date of Patent: Jun. 10, 2014

(54) METHOD AND STRUCTURE FOR SUPPRESSING RESONANCE IN AN ANTI-SHAKE LENS FOCUSING MODULE

(75) Inventors: Fu-Yuan Wu, Yangmei Taoyuan (TW); Ming-Hang Huang, Yangmei Taoyuan (TW); Ying-Chien Hsueh, Yangmei Taoyuan (TW); Kun-I Lee, Yangmei Taoyuan (TW)

(73) Assignee: TDK Taiwan Corporation, Taipei (TW)

( * ) Notice: Subject to any disclaimer, the term of this patent is extended or adjusted under 35 U.S.C. 154(b) by 301 days.

(21) Appl. No.: 13/215,825

(22) Filed: Aug. 23, 2011

(65) Prior Publication Data
US 2013/0050515 A1    Feb. 28, 2013

(51) Int. Cl.
*H04N 5/228* (2006.01)

(52) U.S. Cl.
USPC .................................. 348/208.5; 348/208.99

(58) Field of Classification Search
USPC .......................................... 348/208.5, 208.99
See application file for complete search history.

(56) References Cited

U.S. PATENT DOCUMENTS

| | | | |
|---|---|---|---|
| 5,245,385 A * | 9/1993 | Fukumizu et al. | 399/91 |
| 7,590,342 B2 | 9/2009 | Wu et al. | |
| 7,881,598 B1 | 2/2011 | Wu et al. | |
| 2011/0286732 A1 * | 11/2011 | Hosokawa et al. | 396/55 |

* cited by examiner

*Primary Examiner* — Twyler Haskins
*Assistant Examiner* — Quang Le
(74) *Attorney, Agent, or Firm* — Muncy, Geissler, Olds & Lowe, P.C.

(57) ABSTRACT

A method and a structure for suppressing resonance in an anti-shake lens focusing module are disclosed. The resonance suppressing method includes the steps of providing a lens focusing structure having a first movable part and a first immovable part; providing an anti-shake structure having a second movable part and a second immovable part; providing at least one shock-absorbing material between the first movable and immovable parts as well as between the second movable and immovable parts; and using the shock-absorbing material to absorb any vibration caused by movements of the first and the second movable part, so as to suppress any resonance possibly generated due to the movements of the first and the second movable part.

32 Claims, 7 Drawing Sheets

METHOD AND STRUCTURE FOR SUPPRESSING RESONANCE IN AN ANTI-SHAKE LENS FOCUSING MODULE

FIELD OF THE INVENTION

The present invention relates to a method and a structure for suppressing resonance in an anti-shake lens focusing module, and more particularly to a method for suppressing resonance generated in an anti-shake lens focusing module due to movements of an anti-shake structure and a lens auto-focus structure of the module relative to each other and due to interaction of a vibration frequency in an external environment with a control frequency of a control integrated circuit (IC) of the anti-shake lens focusing module, so that the anti-shake lens focusing module can stably operate in a normal manner.

BACKGROUND OF THE INVENTION

It has become very popular to provide a hand-held device with a camera function, and various anti-shake lens focusing modules have also been developed for incorporating into many advanced hand-held devices in recent years. Lens focusing modules with anti-shake function have been disclosed in many prior art patents and new patent applications, such as U.S. Pat. No. 7,881,598 entitled "Anti-shake Autofocus Modular Structure" granted to the same applicant; U.S. patent application Ser. No. 12/717,596 entitled "Anti-shake Structure for Auto-focus Module" filed by the same applicant, and U.S. patent application Ser. No. 12/910,519 entitled "Tilt-type Anti-shake Compensation Structure for Auto-focus Module" also filed by the same applicant.

Whenever a lens auto-focus structure moves a lens to a desired position for focusing, the lens auto-focus structure will vibrate slightly for a period of time before it gradually returns to a still state again. The time period needed for the lens auto-focus structure to change from the moving state to the still state is referred to as "dynamic response time". U.S. Pat. No. 7,590,342 entitled "Method and Structure for Suppressing Response Time of Lens Focusing Structure" granted to the same applicant discloses technical means for suppressing the dynamic response time of a lens focusing module vibrating in the process of focusing.

Similarly, an anti-shake structure will also vibrate slightly when it moves to correct any image displacement. Since the lens focusing and the image correction occur at the same time in a camera when using the camera to take a picture, it is possible mutual resonance occurs in an anti-shake lens focusing module when the lens focusing structure and the anti-shake structure thereof vibrate simultaneously. Further, the whole anti-shake lens focusing module might become inactive or abnormal when the anti-shake structure and the lens focusing structure thereof are affected by mutual resonance between a control frequency of a control integrated circuit (IC) of the module and a vibration frequency in an external environment.

For example, when the vibration frequency of a moving car, the vibration frequency of hands holding a camera for shooting pictures, the vibration frequency of a lens focusing structure during focusing, and the vibration frequency of an anti-shake structure during image correction exist at the same time, a resonant mode might occur when these four vibration frequencies are close to one another. Such resonant mode would prevent the whole anti-shake lens focusing module form operating normally to even cause failure thereof.

Since the resonant mode obviously has serious adverse influence on the operation of the whole anti-shake lens focusing module, it is necessary to suppress such resonant mode for the anti-shake lens focusing module to operate normally. It is therefore tried by the inventor to develop a method and a structure for suppressing resonance in an anti-shake lens focusing module by providing a shock-absorbing material at proper positions in a lens focusing structure and an anti-shake structure of the anti-shake lens focusing module to suppress any resonance possibly occurred therein.

SUMMARY OF THE INVENTION

A primary object of the present invention is to provide a method for suppressing resonance in an anti-shake lens focusing module. The resonance suppressing method includes the steps of providing a lens focusing structure having a first movable part and a first immovable part, and the first movable part holding a lens thereto for the lens to move along an optical axis forward and backward to achieve auto focusing; providing an anti-shake structure having a second movable part and a second movable part, and the second movable part being movable to achieve image correction; providing at least one shock-absorbing material between the first movable part and the first immovable part as well as between the second movable part and the second immovable part; and using the shock-absorbing material to absorb any vibration caused by movements of the first movable part and the second movable part in achieving auto-focusing and image correction, respectively, so as to suppress any resonance possibly generated due to the movements of the first and the second movable part.

Another object of the present invention is to provide an anti-shake lens focusing module with resonance suppressing structure. The anti-shake lens focusing module includes at least a lens focusing structure having a first movable part and a first immovable part, and the first movable part holding a lens thereto for the lens to move along an optical axis forward and backward to achieve auto focusing; an anti-shake structure having a second movable part and a second movable part, and the second movable part being movable to achieve image correction; and at least one shock-absorbing material provided between the first movable part and the first immovable part as well as between the second movable part and the second immovable part to absorb any vibration caused by movements of the first movable part and the second movable part in achieving auto-focusing and image correction, respectively, so as to suppress any resonance possibly generated due to the movements of the first and the second movable part.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
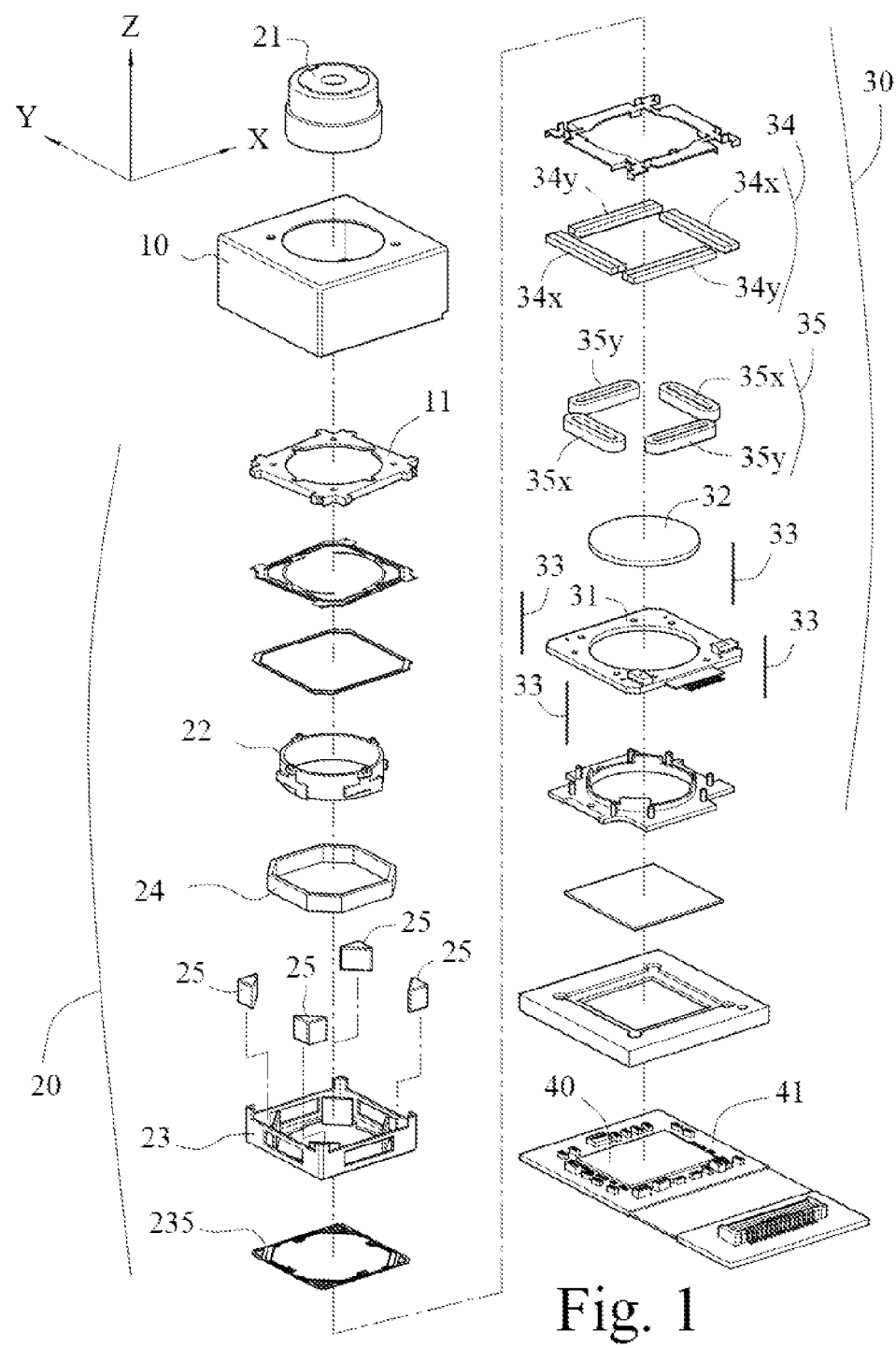
FIG. 1 is an exploded perspective view of an anti-shake lens focusing module with resonance suppressing structure according to a first embodiment of the present invention.

The present invention will now be described with some preferred embodiments thereof and with reference to the accompanying drawings. It is understood the accompanying drawings are illustrated only for assisting in describing the present invention and not intended to limit the present invention in any way. And, for the purpose of easy to understand, elements that are the same in the preferred embodiments are denoted by the same reference numerals.

Please refer to FIG. 1 that is an exploded perspective view of an anti-shake lens focusing module with resonance suppressing structure according to a first embodiment of the present invention. As shown, the anti-shake lens focusing module includes a housing 10, a lens focusing structure 20, an anti-shake structure 30, and an image sensor 40. The lens focusing structure 20, the anti-shake structure 30 and the image sensor 40 all are located in the housing 10 on an optical axis.

The housing 10 is provided with a top plate 11. The lens focusing structure 20 holds a lens 21 thereto and moves the lens 21 forward or backward along the optical axis, i.e. in a z-axis direction, to achieve the purpose of auto focusing, so that an image can be focused on the image sensor 40. The anti-shake structure 30 is able to move in a direction perpendicular to the optical axis or z-axis, such as to move in x-axis or y-axis direction, so as to achieve the purpose of image correction. The image sensor 40 is arranged on a carrier substrate 41.

The method for suppressing resonance in the above-described anti-shake lens focusing module according to the present invention mainly includes two aspects, a first one of which is to suppress any vibration caused by forward or backward movements of the lens focusing structure 20 along the optical axis to achieve auto focusing. The lens focusing structure 20 includes a plurality of elements that can be divided into a first movable part and a first immovable part. The present invention is characterized by providing at least one shock-absorbing material 50 between the first movable part and the first immovable part. The shock-absorbing material 50 may be, for example, a type of soft gel, a flexible spring, a soft rubber material, or a shock-absorbing tape. The shock-absorbing material 50 functions to absorb the vibration caused by movements of the first movable part during operation thereof, so as to suppress any resonant frequency possibly generated by the movements of the first movable part. The suppression of such possible resonant frequency of the first movable part in the lens focusing structure 20 will be described in more details with an embodiment later.

A second one of the two aspects of the method of the present invention is to suppress any vibration caused by movements of the anti-shake structure 30 in x-axis or y-axis direction to achieve image correction. The anti-shake structure 30 also includes a plurality of elements that can be divided into a second movable part and a second immovable part. Similarly, at least one shock-absorbing material 50 is provided between the second movable part and the second immovable part. The shock-absorbing material 50 may be, for example, a type of soft gel, a flexible spring, a soft rubber material, or a shock-absorbing tape. The shock-absorbing material 50 functions to absorb the vibration caused by the movements of the second movable part during operation thereof, so as to suppress any resonant frequency possibly generated by the movements of the second movable part. The suppression of such possible resonant frequency of the second movable part in the anti-shake structure 30 will be described in more details with three embodiments later.

Figure 2:
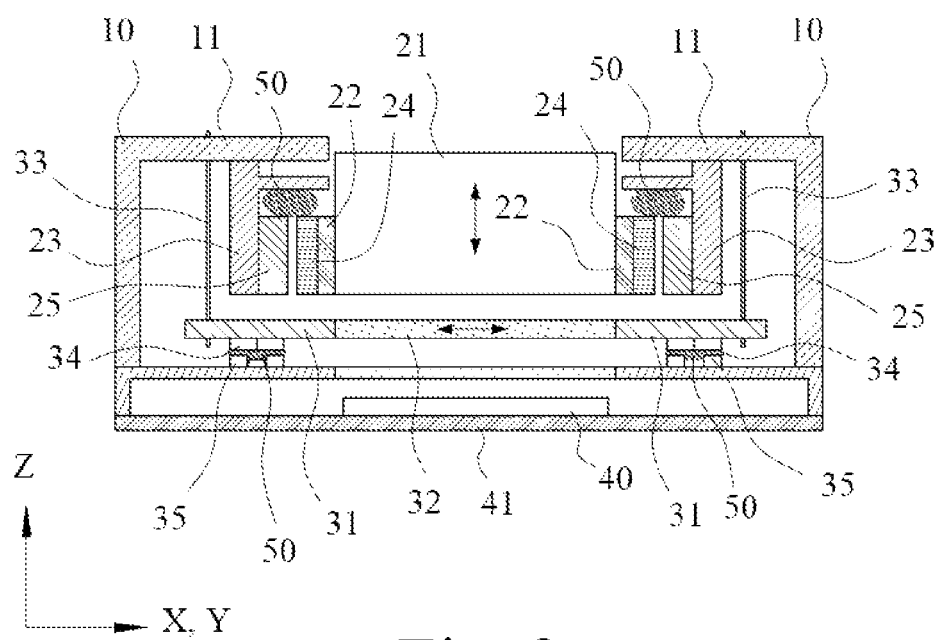
FIG. 2 is an assembled sectional side view of FIG. 1.

FIG. 2 is an assembled sectional side view of FIG. 1. Please refer to FIGS. 1 and 2 at the same time. In the first embodiment, the first movable part of the lens focusing structure 20 is used to hold the lens 21 for the same to complete auto-focusing. Preferably, the lens focusing structure 20 includes at least a lens holder 22 and a frame 23. The lens 21 is centered in the lens holder 22, and a winding 24 is externally provided around the lens holder 22. In the first embodiment, the lens holder 22 and the winding 24 constitute the first movable part of the lens focusing structure 20.

The lens holder 22 is centered in the frame 23. Four magnetic elements 25 are separately fixed to inner sides of four walls of the frame 23 to face toward an outer side of the winding 24 without contacting with the latter. The frame 23 and other elements connected thereto constitute the first immovable part of the lens focusing structure 20.

The shock-absorbing material 50 may be provided between the winding 24 and the magnetic elements 25, that is, between the first movable part and the first immovable part. Preferably, the frame 23 is provided on the four walls thereof with a plurality of receiving slots (not shown) for receiving the shock-absorbing material 50 therein, so that the shock-absorbing material 50 is connected to between the frame 23 and the winding 24.

In the first embodiment of the present invention, the housing 10 constitutes the second immovable part of the anti-shake structure 30. As can be seen in FIG. 2, the housing 10 is connected to the lens focusing structure 20 and the carrier substrate 41 for the image sensor 40.

Figure 4:
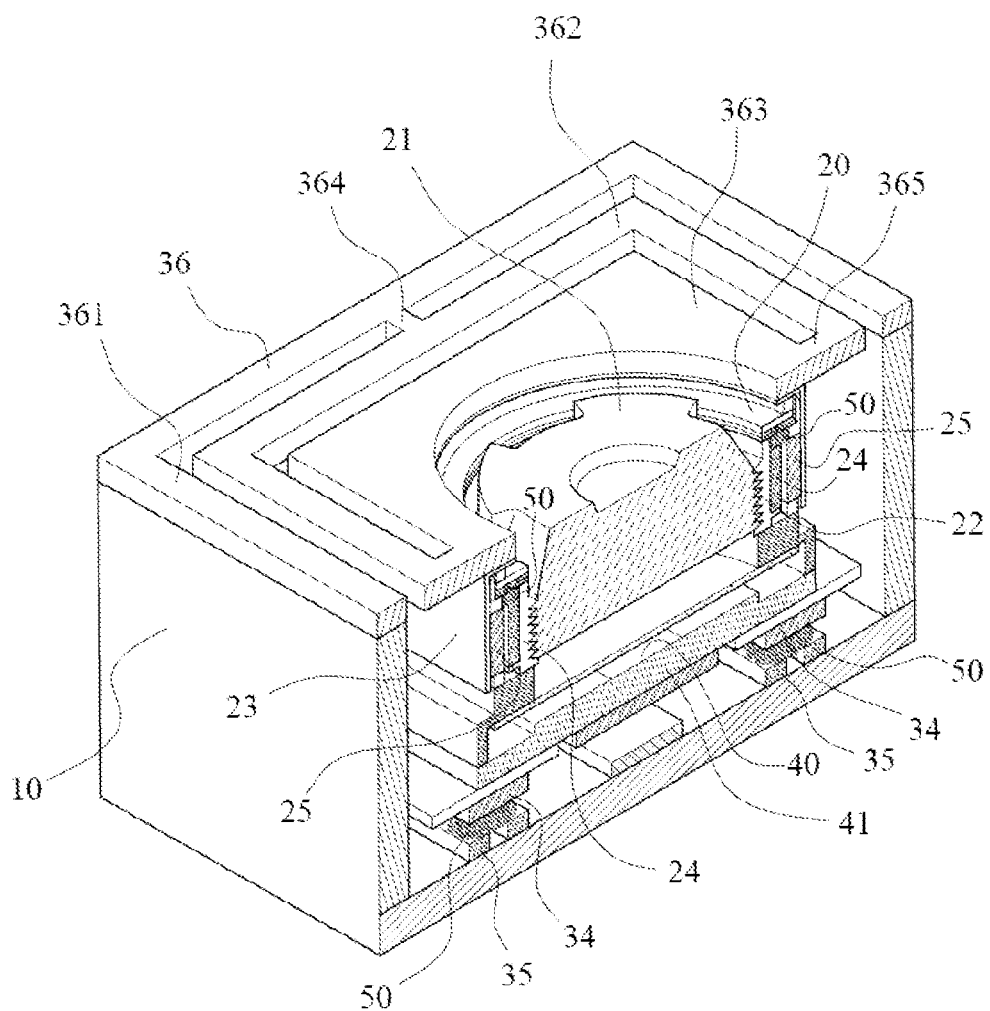
FIG. 4 is a cutaway view showing an embodiment of the present invention having an anti-shake structure using a plate spring as a flexible element thereof.
Figure 5:
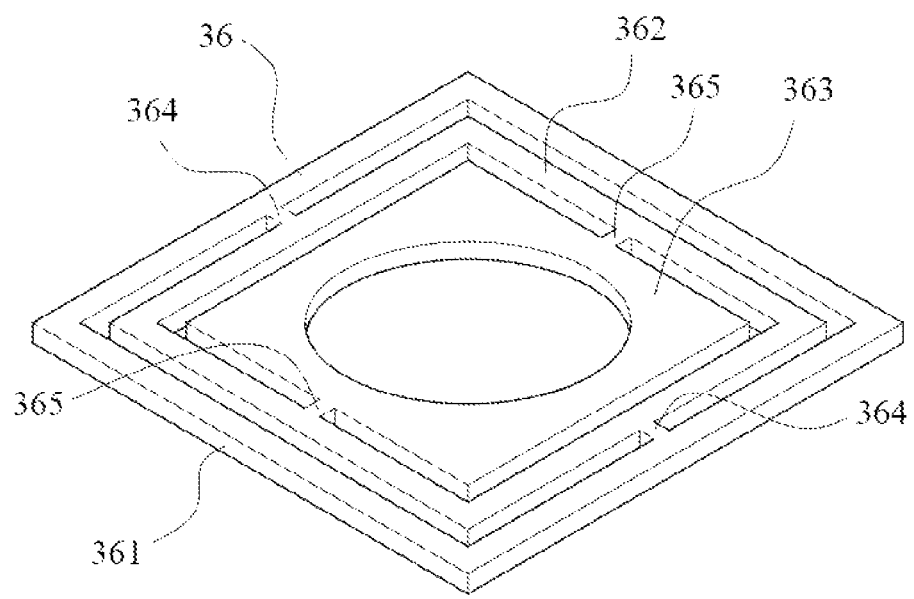
FIG. 5 is a perspective view of the plate spring shown in FIG. 4.

The second movable part of the anti-shake structure 30 includes a correction lens holder 31 for holding a correction lens 32 thereto. At least one flexible element is used to connect the second movable part to the second immovable part. In the illustrated first embodiment, the second movable part is the correction lens holder 31 and the second immovable part is the housing 10, and there are preferably four flexible elements in the form of suspension lines 33 connected to between the top plate 11 of the housing 10 and the correction lens holder 31. Alternatively, the flexible element can be a plate spring 36 as shown in FIGS. 4 and 5, which will be described later. With the suspension lines 33, the correction lens 32 is suspended in the housing 10 over the image sensor 40 to locate on the optical axis for correcting any image deviation caused by hand shaking.

Preferable, the anti-shake structure 30 further includes a magnet assembly 34 and a winding assembly 35. The magnet assembly 34 includes at least one x-axis magnet 34x and at least one y-axis magnet 34y; and the winding assembly 35 includes at least one x-axis winding 35x and at least one y-axis winding 35y. The winding assembly 35 is arranged corresponding to the magnet assembly 34 without contacting with the latter.

One of the magnet assembly 34 and the winding assembly 35 is connected to an element constituting the second movable part, and the other one is connected to an element constituting the second immovable part. The shock-absorbing material 50 is provided between the magnet assembly 34 and the winding assembly 35 to suppress any resonance possibly generated by movements of the second movable part.

Figure 3:
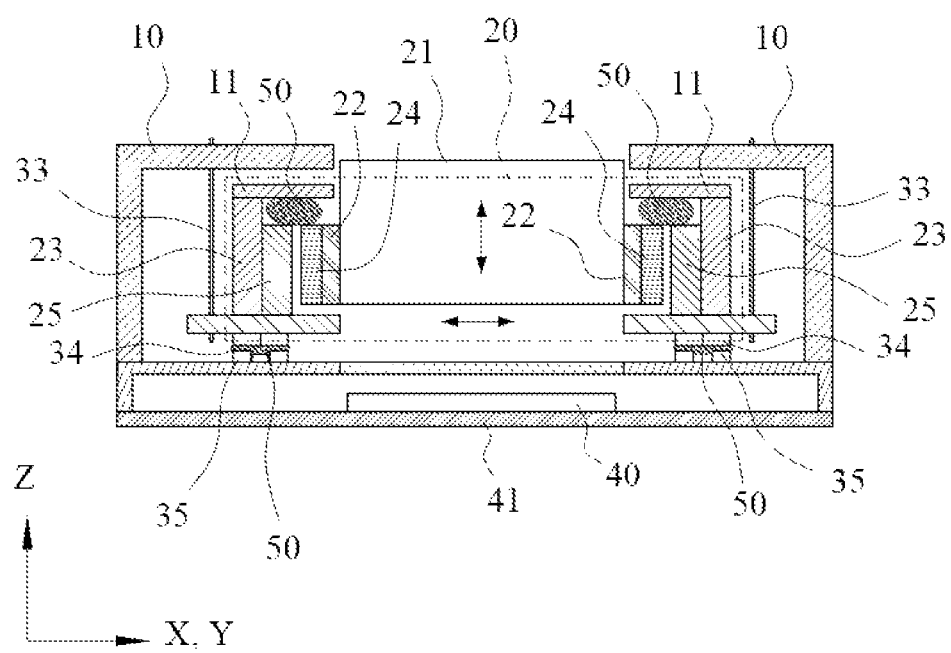
FIG. 3 is an assembled sectional side view of an anti-shake lens focusing module with resonance suppressing structure according to a second embodiment of the present invention.

Please refer to FIG. 3 that is an assembled sectional side view of a second embodiment of the present invention. In the second embodiment, the housing 10 also constitutes the second immovable part of the anti-shake structure 30 and is connected to the carrier substrate 41 for the image sensor 40. The lens focusing structure 20 is received in the housing 10.

The anti-shake structure 30 in the second embodiment further includes at least one flexible element connected to between the second movable part and the second immovable part. In the illustrated second embodiment, the flexible element is connected to between the lens focusing structure 20 and the top plate 11 of the housing 10. The second embodiment is therefore characterized in that the first immovable part of the lens focusing structure 20 also constitutes the second movable part of the anti-shake structure 30.

Preferably, in the second embodiment, there are four flexible elements in the form of suspension lines 33 as shown in FIG. 3. Alternatively, there can be only one flexible element in the form of a plate spring 36 as shown in FIG. 4. FIG. 4 is a cutaway view showing an embodiment of the present invention having an anti-shake structure 30 using a plate spring 36 as a flexible element thereof. With the plate spring 36, the lens focusing structure 20 is suspended in the housing 10 to locate on the optical axis, so that the first immovable part of the lens focusing structure 20 also constitutes the second movable part.

Please also refer to FIG. 5 that is a perspective view of an embodiment of the plate spring 36. As shown, the plate spring 36 includes an outer fixed portion 361, an outer movable portion 362, and an inner movable portion 363. The outer fixed portion 361 is fixedly connected to the top plate 11 of the housing 10. The outer movable portion 362 is located at an inner side of the fixed outer portion 361 and connected to the latter via two opposite first supports 364, so as to define two opposite symmetrical U-shaped slots between the outer fixed portion 361 and the outer movable portion 362. The inner movable portion 363 is located at an inner side of the outer movable portion 363 and connected to the latter via two opposite second supports 365, so as to define two opposite symmetrical U-shaped slots between the outer movable portion 362 and the inner movable portion 363. It is noted the second supports 365 are angularly spaced from the first supports 364 by 90 degrees, and the U-shaped slots between the outer and inner movable portions 362, 363 are also angularly spaced from the U-shaped slots between the outer movable portion 362 and the outer fixed portion 361 by 90 degrees. Further, the inner movable portion 363 is connected to the lens focusing structure 20.

As can be seen in FIG. 4, the outer movable portion 362 allows the lens focusing structure 20 to tilt and displace in x-axis direction, and the inner movable portion 363 allows the lens focusing structure 20 to tilt and displace in y-axis direction.

Preferably, the anti-shake structure 30 in the second embodiment further includes a magnet assembly 34 and a winding assembly 35. The magnet assembly 34 includes at least one x-axis magnet and at least one y-axis magnet; and the winding assembly 35 includes at least one x-axis winding and at least one y-axis winding. Further, the winding assembly 35 is arranged corresponding to the magnet assembly 34 without contacting with the latter.

One of the magnet assembly 34 and the winding assembly 35 is connected to the housing 10 or other element connected thereto, such as the carrier substrate 41 for the image sensor 40, and thereby forms an element of the second immovable part. The other one of the magnet assembly 34 and the winding assembly 35 is connected to the lens focusing structure 20 to constitute an element of the second movable part. Further, the shock-absorbing material 50 is provided between the magnet assembly 34 and the winding assembly 35.

Figure 6:
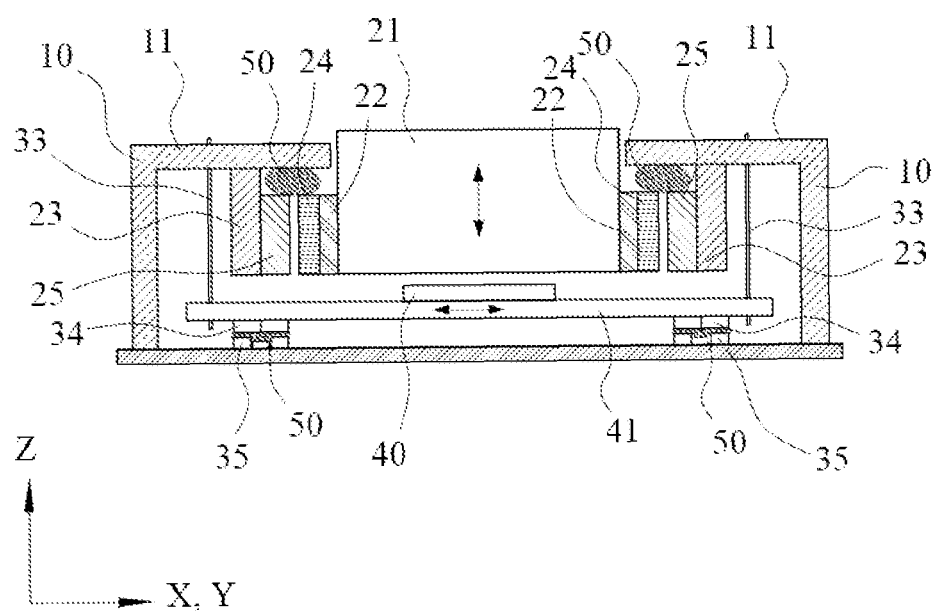
FIG. 6 is an assembled sectional side view of an anti-shake lens focusing module with resonance suppressing structure according to a third embodiment of the present invention.

FIG. 6 is an assembled sectional side view of a third embodiment of the present invention. In the third embodiment, the top plate 11 shown in FIG. 1 also constitutes the first immovable part of the lens focusing structure 20, and the housing 10 is connected to the lens focusing structure 20.

The anti-shake structure 30 in the third embodiment further includes at least one flexible element connected to between the second movable part and the second immovable part. In the third embodiment, the flexible element is connected to between the carrier substrate 41 for the image sensor 40 and the top plate 11 of the housing 10. Preferably, there are four flexible elements in the form of suspension lines 33. Alternatively, there can be only one flexible element in the form of a plate spring (not shown in FIG. 6). With the suspension lines 33 or the plate spring, the carrier substrate 41 is suspended in the housing 10 to locate on the optical axis behind the lens focusing structure 20 and accordingly constitutes the second movable part.

Preferably, the anti-shake structure 30 in the third embodiment further includes a magnet assembly 34 and a winding assembly 35. The magnet assembly 34 includes at least one x-axis magnet and at least one y-axis magnet; and the winding assembly 35 includes at least one x-axis winding and at least one y-axis winding. Further, the winding assembly 35 is arranged corresponding to the magnet assembly 34 without contacting with the latter.

One of the magnet assembly 34 and the winding assembly 35 is connected to the housing 10 or other element connected thereto and thereby constitutes an element of the second immovable part. The other one of the magnet assembly 34 and the winding assembly 35 is connected to the carrier substrate 41 to constitute an element of the second movable part. Further, the shock-absorbing material 50 is provided between the magnet assembly 34 and the winding assembly 35.

Figure 7:
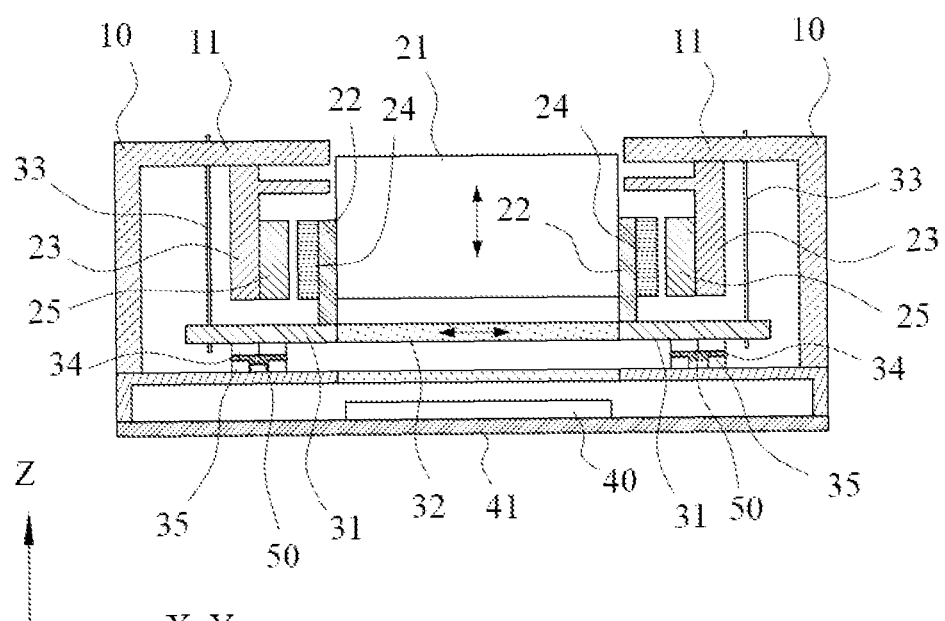
FIG. 7 is an assembled sectional side view of an anti-shake lens focusing module with resonance suppressing structure according to a fourth embodiment of the present invention.

FIG. 7 is an assembled sectional side view of a fourth embodiment of the present invention. In the fourth embodiment, the lens focusing structure 20 is connected to the correction lens holder 31 of the anti-shake structure 30. That is, the first movable part and the second movable part are connected to each other to form a movable part, and the first immovable part and the second immovable part together form an immovable part. Therefore, the shock-absorbing material 50 is provided only between the magnet assembly 34 and the winding assembly 35 (i.e. between the second movable part and the second immovable part). More specifically, the shock-absorbing material 50 is only needed between the movable part and the immovable part for suppressing any resonance possibly generated due to movements of the movable part while the shock-absorbing material 50 that is provided between the magnetic element 25 (i.e. the first movable part) and the winding 24 (i.e. the first immovable part) in other embodiments is omitted from the fourth embodiment.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A method for suppressing resonance in an anti-shake lens focusing module, compressing the following steps:

providing a lens focusing structure having a first movable part and a first immovable part; and the first movable part holding a lens thereto for the lens to move along an optical axis forward and backward to achieve auto focusing;

providing an anti-shake structure having a second movable part and a second immovable part; and the second movable part being movable to achieve image correction;

providing at least one shock-absorbing material between the first movable part and the first immovable part as well as between the second movable part and the second immovable part; and using the shock-absorbing material to absorb any vibration caused by movements of the first movable part and the second movable part in achieving auto-focusing and image correction, respectively, so as to suppress any resonance possibly generated due to the movements of the first and the second moving parts.

2. The resonance suppressing method as claimed in claim 1, wherein the shock-absorbing material is selected from the group consisting of soft gel, flexible springs, soft rubber materials, and shock-absorbing tapes.

3. The resonance suppressing method as claimed in claim 1, wherein the lens focusing structure includes:
   a lens holder constituting the first movable part with the lens centered therein and a winding externally provided therearound; and
   a frame constituting the first immovable part with the lens holder centered therein and a plurality of magnetic elements fixed to an inner side of walls of the frame, such that the magnetic elements face toward an outer side of the winding without contacting with the latter.

4. The resonance suppressing method as claimed in claim 3, wherein the shock-absorbing material is provided between the walls of the frame and the lens holder.

5. The resonance suppressing method as claimed in claim 3, wherein the frame is provided on the walls thereof with receiving slots for receiving the shock-absorbing material therein.

6. The resonance suppressing method as claimed in claim 1, wherein the anti-shake structure includes:
   a housing constituting the second immovable part, to which the lens focusing structure is connected;
   a carrier substrate having an image sensor provided thereon and being connected to the housing to constitute the second immovable part;
   a correction lens holder having a correction lens provided thereon and constituting the second movable part;
   at least one flexible element being connected to between the second movable part and the second immovable part, so that the correction lens is suspended in the housing to locate on the optical axis;
   a magnet assembly including at least one x-axis magnet and at least one y-axis magnet; and
   a winding assembly including at least one x-axis winding and at least one y-axis winding;
and the winding assembly being arranged corresponding to the magnet assembly without contacting with the latter;
   wherein one of the magnet assembly and the winding assembly is connected to the second movable part while the other one of them is connected to the second immovable part, and the shock-absorbing material is provided between the magnet assembly and the winding assembly.

7. The resonance suppressing method as claimed in claim 6, wherein the correction lens is suspended in the housing by the at least one flexible element to locate between the lens focusing structure and the image sensor.

8. The resonance suppressing method as claimed in claim 6, wherein the at least one flexible element includes a plurality of suspension lines.

9. The resonance suppressing method as claimed in claim 6, wherein the at least one flexible element includes a plate spring.

10. The resonance suppressing method as claimed in claim 1, wherein the anti-shake structure includes:
   a housing constituting the second immovable part;
   a carrier substrate having an image sensor provided thereon and being connected to the housing to constitute the second immovable part;
   at least one flexible element being connected to between the lens focusing structure and the second immovable part, so that the lens focusing structure constitutes the second movable part and is suspended in the housing to locate on the optical axis;
   a magnet assembly including at least one x-axis magnet and at least one y-axis magnet; and
   a winding assembly including at least one x-axis winding and at least one y-axis winding;
and the winding assembly being arranged corresponding to the magnet assembly without contacting with the latter;
   wherein one of the magnet assembly and the winding assembly is connected to the second movable part while the other one of them is connected to the second immovable part, and the shock-absorbing material is provided between the magnet assembly and the winding assembly.

11. The resonance suppressing method as claimed in claim 10, wherein the at least one flexible element includes a plurality of suspension lines.

12. The resonance suppressing method as claimed in claim 10, wherein the at least one flexible element includes a plate spring.

13. The resonance suppressing method as claimed in claim 1, wherein the anti-shake structure includes:
   a housing constituting the second immovable part and being connected to the lens focusing structure;
   a carrier substrate having an image sensor provided thereon and constituting the second movable part;
   at least one flexible element being connected to between the second movable part and the second immovable part, so that the carrier substrate is suspended in the housing to locate on the optical axis behind the lens focusing structure;
   a magnet assembly including at least one x-axis magnet and at least one y-axis magnet; and
   a winding assembly including at least one x-axis winding and at least one y-axis winding;
and the winding assembly being arranged corresponding to the magnet assembly without contacting with the latter;
   wherein one of the magnet assembly and the winding assembly is connected to the second movable part while the other one of them is connected to the second immovable part, and the shock-absorbing material is provided between the magnet assembly and the winding assembly.

14. The resonance suppressing method as claimed in claim 13, wherein the at least one flexible element includes a plurality of suspension lines.

15. The resonance suppressing method as claimed in claim 13, wherein the at least one flexible element includes a plate spring.

16. The resonance suppressing method as claimed in claim 13, wherein the first movable part and the second movable part are connected to each other, such that the shock-absorbing material is provided only between the second movable part and the second immovable part without the need of being provided between the first movable part and the first immovable part.

17. An anti-shake lens focusing module with resonance suppressing structure, comprising:
  a lens focusing structure having a first movable part and a first immovable part; and the first movable part holding a lens thereto for the lens to move along an optical axis forward and backward to achieve auto focusing;
  an anti-shake structure having a second movable part and a second immovable part; and
the second movable part being movable to achieve image correction; and
  at least one shock-absorbing material being provided between the first movable part and the first immovable part as well as between the second movable part and the second immovable part to absorb any vibration caused by movements of the first movable part and the second movable part in achieving auto-focusing and image correction, respectively, so as to suppress any resonance possibly generated due to the movements of the first and the second movable parts.

18. The anti-shake lens focusing module as claimed in claim 17, wherein the shock-absorbing material is selected from the group consisting of soft gel, flexible springs, soft rubber materials, and shock-absorbing tapes.

19. The anti-shake lens focusing module as claimed in claim 17, wherein the lens focusing structure includes:
  a lens holder constituting the first movable part with the lens centered therein and a winding externally provided therearound; and
  a frame constituting the first immovable part with the lens holder centered therein and a plurality of magnetic elements fixed to an inner side of walls of the frame, such that the magnetic elements face toward an outer side of the winding without contacting with the latter.

20. The anti-shake lens focusing module as claimed in claim 19, wherein shock-absorbing material is provided between the walls of the frame and the lens holder.

21. The anti-shake lens focusing module as claimed in claim 19, wherein the frame is provided on the walls with receiving slots for receiving the shock-absorbing material therein.

22. The anti-shake lens focusing module as claimed in claim 17, wherein the anti-shake structure includes:
  a housing constituting the second immovable part, to which the lens focusing structure is connected;
  a carrier substrate having an image sensor provided thereon and being connected to the housing to constitute the second immovable part;
  a correction lens holder having a correction lens provided thereon and constituting the second movable part;
  at least one flexible element being connected to between the second movable part and the second immovable part, so that the correction lens is suspended in the housing to locate on the optical axis;
  a magnet assembly including at least one x-axis magnet and at least one y-axis magnet; and
  a winding assembly including at least one x-axis winding and at least one y-axis winding;
and the winding assembly being arranged corresponding to the magnet assembly without contacting with the latter;
  wherein one of the magnet assembly and the winding assembly is connected to the second movable part while the other one of them is connected to the second immovable part, and the shock-absorbing material is provided between the magnet assembly and the winding assembly.

23. The anti-shake lens focusing module as claimed in claim 22, wherein the correction lens is suspended in the housing by the at least one flexible element to locate between the lens focusing structure and the image sensor.

24. The anti-shake lens focusing module as claimed in claim 22, wherein the at least one flexible element includes a plurality of suspension lines.

25. The anti-shake lens focusing module as claimed in claim 22, wherein the at least one flexible element includes a plate spring.

26. The anti-shake lens focusing module as claimed in claim 17, wherein the anti-shake structure includes:
  a housing constituting the second immovable part;
  a carrier substrate having an image sensor provided thereon and being connected to the housing to constitute the second immovable part;
  at least one flexible element being connected to between the lens focusing structure and the second immovable part, so that the lens focusing structure constitutes the second movable part and is suspended in the housing to locate on the optical axis;
  a magnet assembly including at least one x-axis magnet and at least one y-axis magnet; and
  a winding assembly including at least one x-axis winding and at least one y-axis winding;
and the winding assembly being arranged corresponding to the magnet assembly without contacting with the latter;
  wherein one of the magnet assembly and the winding assembly is connected to the second movable part while the other one of them is connected to the second immovable part, and the shock-absorbing material is provided between the magnet assembly and the winding assembly.

27. The anti-shake lens focusing module as claimed in claim 26, wherein the at least one flexible element includes a plurality of suspension lines.

28. The anti-shake lens focusing module as claimed in claim 26, wherein the at least one flexible element includes a plate spring.

29. The anti-shake lens focusing module as claimed in claim 17, wherein the anti-shake structure includes:
  a housing constituting the second immovable part and being connected to the lens focusing structure;
  a carrier substrate having an image sensor provided thereon and constituting the second movable part;
  at least one flexible element being connected to between the second movable part and the second immovable part, so that the carrier substrate is suspended in the housing to locate on the optical axis behind the lens focusing structure;
  a magnet assembly including at least one x-axis magnet and at least one y-axis magnet; and
  a winding assembly including at least one x-axis winding and at least one y-axis winding;
and the winding assembly being arranged corresponding to the magnet assembly without contacting with the latter;
  wherein one of the magnet assembly and the winding assembly is connected to the second movable part while the other one of them is connected to the second immovable part, and the shock-absorbing material is provided between the magnet assembly and the winding assembly.

30. The anti-shake lens focusing module as claimed in claim 29, wherein the at least one flexible element includes a plurality of suspension lines.

31. The anti-shake lens focusing module as claimed in claim 29, wherein the at least one flexible element includes a plate spring.

32. The anti-shake lens focusing module as claimed in claim 29, wherein the first movable part and the second movable part are connected to each other, such that the shock-absorbing material is provided only between the second movable part and the second immovable part without the need of being provided between the first movable part and the first immovable part.

* * * * *